United States Patent [19]

Leeds et al.

[11] Patent Number: 4,562,987

[45] Date of Patent: Jan. 7, 1986

[54] COMPUTER TERMINAL SUPPORT WITH FIVE DEGREES OF FREEDOM

[75] Inventors: Richard Leeds, Lawrence; Bruce Leeds, Jericho; Robert Leeds, New York, all of N.Y.

[73] Assignee: Global Equipment Company, Hempstead, N.Y.

[21] Appl. No.: 610,133

[22] Filed: May 14, 1984

[51] Int. Cl.⁴ .............................................. E04G 3/00
[52] U.S. Cl. .................................... 248/278; 248/283
[58] Field of Search ............... 248/283, 282, 349, 183, 248/181, 371, 663, 179, 649, 278; 179/2 TV

[56] References Cited

U.S. PATENT DOCUMENTS

| | | | |
|---|---|---|---|
| 818,982 | 4/1906 | Skelley | 248/282 |
| 895,834 | 8/1908 | Aungst | 248/283 |
| 1,286,241 | 12/1918 | Crowl | 248/283 |
| 1,733,107 | 10/1929 | Ahlberg | 248/278 X |
| 2,333,516 | 11/1943 | Brusilowsky | 108/29 X |
| 2,604,927 | 7/1952 | Bonnesen | 248/371 |
| 2,727,562 | 12/1955 | Glascock | 248/371 |
| 3,054,187 | 9/1962 | Staunt | 248/310 X |
| 3,195,731 | 7/1965 | Bomar | 248/302 X |
| 4,379,429 | 4/1983 | Gubbe et al. | 108/5 |
| 4,437,638 | 3/1984 | Scheibenpflug | 248/282 |

Primary Examiner—J. Franklin Foss
Attorney, Agent, or Firm—Edward F. Levy

[57] ABSTRACT

A computer terminal support includes two vertical posts about which respective pivoting collars are free to pivot. Each pivoting collar is affixed to a swivel arm. A terminal support tray is affixed to an outer end of the outer one of the two swivel arms to thereby provide a substantial coverage area over which the computer terminal may be disposed. A vertical adjustment of the position of the outer pivoting collar on the outer vertical post is provided in order to permit adjustment of the vertical position of the display screen of the display device of the computer terminal. A horizontal pivot and a vertical pivot are provided for rotation of the computer terminal and its associated display screen of the display device in order to permit angular adjustment of the display screen anywhere within the coverage area for avoiding interference from glare.

17 Claims, 4 Drawing Figures

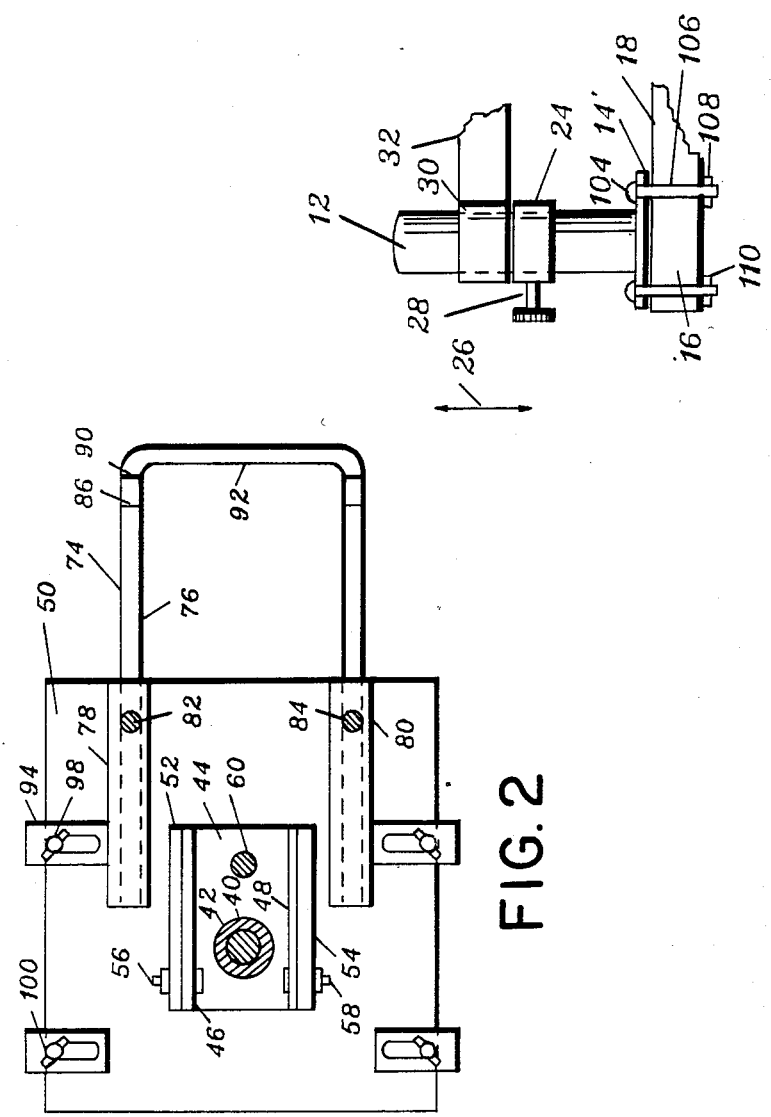

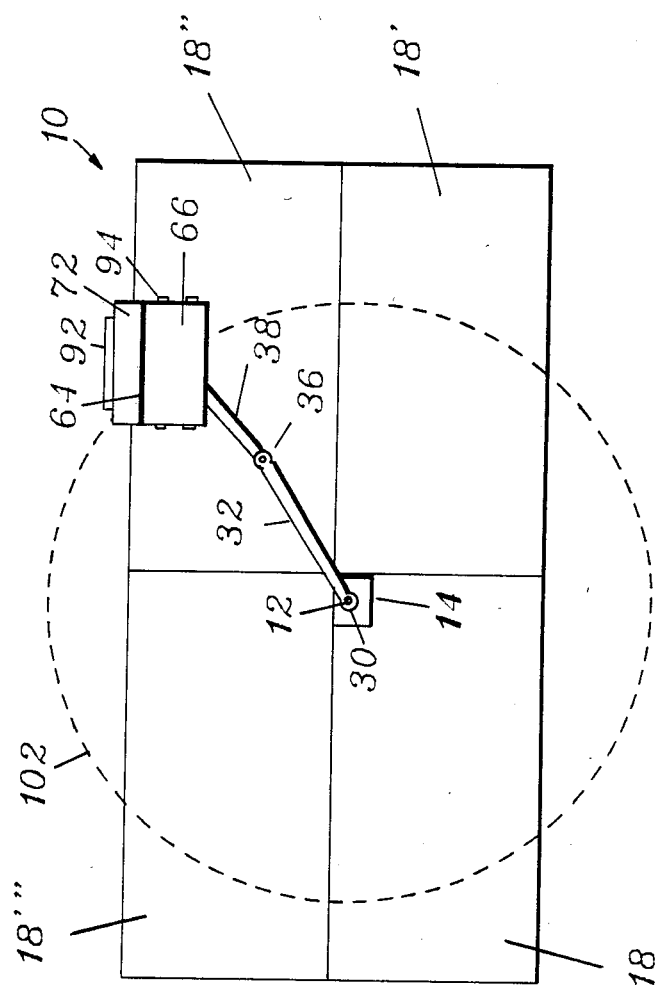

COMPUTER TERMINAL SUPPORT WITH FIVE DEGREES OF FREEDOM

BACKGROUND OF THE INVENTION

The present invention relates to support devices and, more particularly, to support devices for supporting terminals of computer systems.

The relatively recent appearance of the computer terminal as a ubiquitous feature of the office workplace has significantly changed the ergonomic requirements of such office workplace. Whether the computer terminal is a stand-alone unit having its own processor or a remote dumb terminal of a central computer system, it generally consists of an input device, such as, for example, a QWERTY keyboard and/or a numeric keypad, and an output device, such as, for example, a cathode ray tube (CRT), liquid crystal display (LCD) or other numeric, alphanumeric or graphic display device. The input device and the display device may be physically separable using, for example, a flexible cord to permit independent movement of the input device for accommodating the individual needs of the worker, or the input device and the display device may be integrated into a single unitary assembly.

Although computer terminals may also include such additional input and output devices as card or paper tape punches and readers and/or printing devices and the like, these devices are not considered to be relevant to present disclosure and are therefore not further considered herein. For concreteness of description, the terminal support disclosed herein is adapted to the support of a computer terminal having a CRT and a QWERTY keyboard with these elements being either separable or unitary. One skilled in the art would recognize that the disclosure herein may be applied to other computer terminal configurations and that terminal supports therefor constructed according to the teachings of the present invention should be considered to be within the scope of the present invention.

A worker at a computer terminal may be required to spend longer hours in a more constrained physical posture than is required of workers at many other business tasks. In order to maintain worker comfort and efficiency, more care must be given to the ergonomic requirements of the worker at a computer terminal. These include appropriate desk height and design, chair design for maintenance of comfortable and efficient posture and an appropriate balance between general lighting and task lighting. It is especially important to position the CRT in height, transverse position, depth position, vertical axis rotation and at least one horizontal axis rotation for comfortable viewing without excessive head and eye motion and without distracting reflections from the screen of the CRT.

A computer terminal represents a substantial capital investment. Many work situations require that several workers have access to a computer terminal but do not warrant the expense of a separate computer terminal for each worker. One solution is disclosed in U.S. Pat. No. 4,305,563 wherein a computer terminal support includes means for permitting rotation about a single vertical axis and for permitting translation of the computer terminal toward and away from the vertical axis. When several workers' desks are arranged in an island with the vertical axis centrally disposed, the display of the computer terminal may be rotated about the single vertical axis to face a worker at any one of the several desks in the island and may be translated toward and away from the worker. Having only a single axis, this device permits very limited positioning of the display device and thus fails to satisfy all of the ergonomic needs of the workers.

U.S. Pat. No. 4,365,561 discloses a pedestal-mounted device for supporting a computer terminal. This device provides rotation of the display device about the vertical axis of the pedestal and about a horizontal axis for angularly positioning the display device and provides vertical motion of the pedestal for vertically positioning the display device and keyboard. This device has very limited provision for horizontally positioning the computer terminal for use by even one worker since its horizontal position is rigidly constrained by the position of the pedestal. Basically, this device requires that the worker move from the normal desk location to an auxiliary work station comprised of the disclosed pedestal-mounted device with its supported computer terminal. For tasks requiring back-and-forth reference to materials at the normal desk location and at the terminal, a substantial amount of chair swivelling or sliding and worker motion is required. If use of the terminal by more than one worker is required, the workers' desks must be arranged with a substantial open space between them so that any one of them requiring access to the computer terminal can rotate the computer terminal about the vertical axis of the pedestal and then either move the regular desk chair up to the computer terminal or use a separate chair maintained at the computer terminal.

Other support devices are disclosed in U.S. Pat. No. 2,849,534 for supporting a tray in a drive-in restaurant; U.S. Pat. No. 2,991,138 for supporting a tray; U.S. Pat. No. 3,157,379 for supporting furniture to a wall bracket and U.S. Pat. No. 4,085,961 for supporting a tool box to a pickup truck. None of these additional references either addresses or solves the ergonomic problems of supporting a computer terminal for the efficient and comfortable use by one or more workers.

OBJECTS AND SUMMARY OF THE INVENTION

Accordingly, it is an object of the invention to provide a support for a computer terminal which overcomes the drawbacks of the prior art.

It is a further object of the invention to provide a support for a computer terminal which provides efficient and comfortable use of a computer terminal by one or more workers at their regular workplaces.

It is a still further object of the invention to provide a support for a computer terminal which provides translation of the computer terminal in three dimensions and rotation of at least the display device of the computer terminal about at least two axes.

It is a still further object of the invention to provide a support for a computer terminal having adjustable means for supporting a separable keyboard.

It is a still further object of the invention to provide a support for a computer terminal having means adaptable for supporting a computer terminal having a wide variety of footprint dimensions.

Briefly stated, the present invention provides a computer terminal support having two vertical posts about which respective pivoting collars are free to pivot. Each pivoting collar is affixed to a swivel arm. A terminal support tray is affixed to an outer end of the outer one of the two swivel arms to thereby provide a substantial coverage area over which the computer terminal may be disposed. A vertical adjustment of the position of the outer pivoting collar on the outer vertical post is provided in order to permit adjustment of the vertical position of the display screen of the display device of the computer terminal. A horizontal pivot and a vertical pivot are provided for rotation of the computer terminal and its associated display screen of the display device in order to permit angular adjustment of the display screen anywhere within the coverage area for avoiding interference from glare.

According to an embodiment of the invention, there is provided a computer terminal support comprising a king post, means for affixing the king post with a first axis thereof disposed in a substantially vertical position, first pivoting means rotatable in a substantially horizontal direction about the first axis, means for adjusting a vertical position of the pivoting means along the first axis, a first swivel arm affixed to the pivoting means for concerted rotation therewith about the first axis, second pivoting means at a distal end of the first swivel arm rotatable in a substantially horizontal direction about a second substantially vertical axis, a second swivel arm affixed to the auxiliary swivel means for concerted rotation therewith about the second axis, a third pivoting means at a distal end of the second swivel arm rotatable in a substantially horizontal direction about a third substantially vertical axis, means affixed to the third pivoting means for supporting a computer terminal thereon, and the last-mentioned means including means for permitting rotation of the computer terminal about a fourth substantially horizontal axis whereby adjustment of a position of the computer terminal with five degrees of freedom is provided.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a cross section taken along II—II in FIG. 1.

FIG. 3 is an overhead view of an island having a plurality of desks arranged to share the use of a single computer terminal using an embodiment of the present invention.

FIG. 4 is a cross section corresponding to the cross section of FIG. 2 showing a further method of supporting the apparatus.

DETAILED DESCRIPTION OF THE PREFERRED EMBODIMENT

Figure 1:
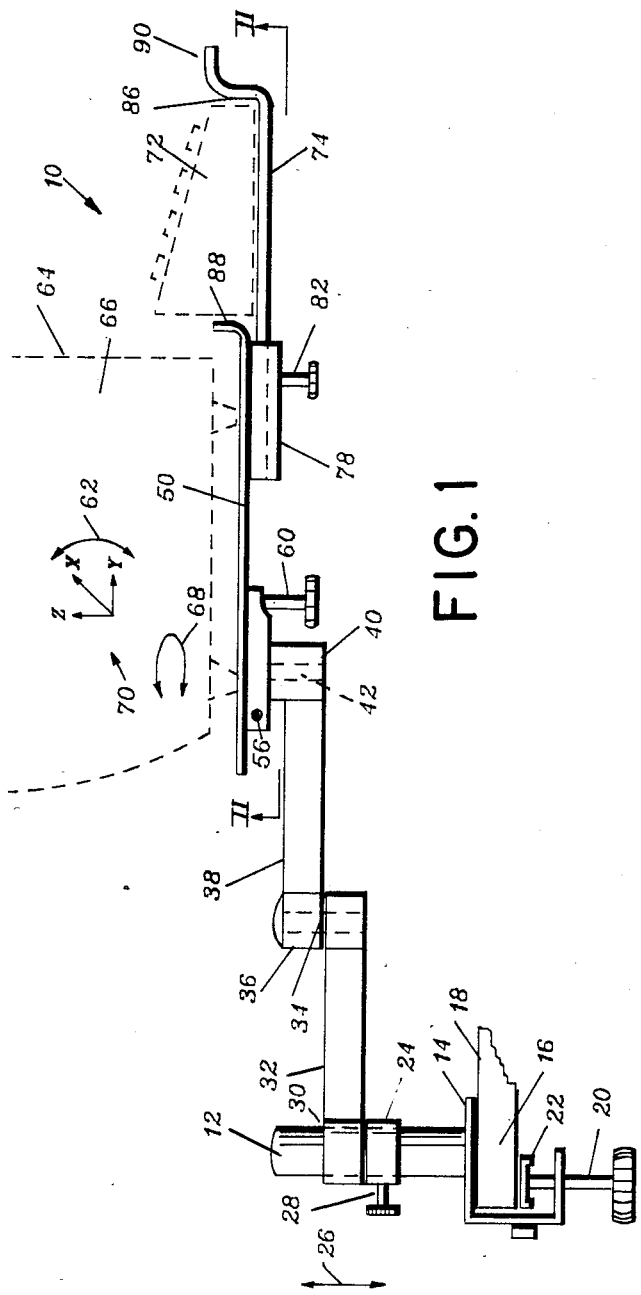
FIG. 1 is an overall perspective view of a computer terminal support according to an embodiment of the invention.

Referring now to FIG. 1, there is shown, generally at 10, a computer terminal support according to an embodiment of the invention. A king post 12 is supported with its axis aligned in a generally vertical direction. One type of support for king post 12 includes a U-shaped clamp 14 which may be placed over a ledge 16 of a desk 18. A clamping bolt 20 may be tightened against an underside of ledge 16 optionally using a plate 22 therebetween.

A height-adjusting collar 24 is fitted over king post 12 and may be adjusted upward and downward as indicated by a double-headed arrow 26. A clamping bolt 28 may be threaded through height-adjusting collar 24 and tightened against king post 12 to fix height-adjusting collar 24 in a desired vertical position. A pivoting bearing collar 30 is fitted over king post 12 and is maintained in a desired vertical position by height-adjusting collar 24. An inner swivel arm 32 extends generally horizontally outward from pivoting bearing collar 30. Inner swivel arm 32 may be rotated at will about king post 12.

An intermediate bearing post 34 project vertically upward from a distal end of inner swivel arm 32 and engages an auxiliary bearing collar 36. An outer swivel arm 38 is affixed to auxiliary bearing collar 36 for rotation about intermediate bearing post 34. An outer bearing collar 40 is disposed at a distal end of outer swivel arm 38. Referring now also to FIG. 2, a vertical pivot shaft 42 is rotatably supported in outer bearing collar 40. An intermediate support tray 44 is affixed to an upper end of vertical pivot shaft 42 for concerted rotation therewith in a substantially horizontal plane. Intermediate support tray 44 includes first and second vertically disposed dependent lips 46 and 48.

A terminal support tray 50 is disposwed atop intermediate support tray 44. Terminal support tray 50 includes first and second vertically disposed dependent lips 52 and 54 adjacent to dependent lips 46 and 48 respectively. A first horizontal pivot 56 passes through dependent lip 46 and dependent lip 52 for permitting these elements to pivot with respect to each other about a horizontal axis. A second horizontal pivot 58 passes through dependent lip 48 and dependent lip 54 for permitting these elements to pivot with respect to each other about the same horizontal axis. A jack screw 60 is threadably engaged with intermediate support tray 44 and bears against terminal support tray 50.

It would be clear to one skilled in the art that adjustment of jack screw 60 is effective to rotate terminal support tray 50 through a limited angle, as indicated by a vertical arc 62 in FIG. 1 whereby a display screen 64 of a computer terminal 66 is tiltable through the vertical angle indicated by vertical arc 62. Similarly, rotation of intermediate support tray 44 about an axis defined by vertical pivot shaft 42 is effective to rotate display screen 64 through a substantial horizontal angle indicated by a horizontal arc 68. Such rotation of display screen 64 about horizontal and vertical axes is valuable for positioning display screen 64 at an angle which is both comfortable to see and avoids the interfering reflection of general or task lighting sources to the viewer. An orthogonal axis system 70, having X, Y and Z axes, is also indicated superimposed on computer terminal 66. The working vertical, or Z, location of computer terminal 66 is adjustable by adjustment of the vertical location at which height-adjusting collar 24 is locked. The X and Y, or horizontal, locations of computer terminal 66 are widely adjustable by selecting the angular positions of inner swivel arm 32 and outer swivel arm 38. Thus, adjustability of position of computer terminal 66 is provided which includes five degrees of freedom; that is, three degrees of freedom in translation and two degrees of freedom in angle. This wide adjustability of position and angle satisfies all of the ergonomic requirements for efficient use of computer terminal 66.

It is desirable to make computer terminal support 10 adaptable to as wide a range of computer terminals 66 as possible. As previously mentioned, the present invention is intended for use with a computer terminal 66 having a separable keyboard 72, as shown, as well as with a computer terminal 66 having an integral keyboard (not shown). An adjustable keyboard support 74 is provided for supporting separable keyboard 72 during non-use and for limited activity during use. In the embodiment shown, adjustable keyboard support 74 is a heavy wire structure having first and second legs 76 fitted into support tubes 78 and 80. Clamping screws 82 and 84 threadably engaged in support tubes 78 and 80 are effective to permit outward adjustment of adjustable keyboard support 74. A vertically upward bend 86 at the outer extremities of legs 76 cradles separable keyboard 72 between itself and a forward lip 88 on terminal support tray 50. Forward lip 88 also restrains forward motion of computer terminal 66 which may occur due to a downward inclination of terminal support tray 50 toward the viewer.

A forward bend 90 at the upper extremity of vertically upward bend 86 provides a bar 92 which a user may conveniently grasp for moving computer terminal 66 into a desired X and Y position as well as for rotating it about a horizontal angle as indicated by horizontal arc 68 for comfortable use. The utility of bar 92 continues to exist for positional and angular adjustment of display screen 64 whether computer terminal 66 is of the type having a separable keyboard 72 or a type having a unitary keyboard (not shown).

As is well known, computer terminal 66 are available in a wide variety of sizes. Of particular importance to the present discussion is the footprint, or depth and width dimension, of a particular computer terminal 66 being supported. In order to further increase the adaptability of computer terminal support 10 to a variety of computer terminals 66, computer terminal support 10 includes a plurality of extension wings 94 at least at edges of terminal support tray 50 for constraining a base of a computer terminal 66 against lateral sliding. Each extension wing 94 includes an adjustment slot 96 therein. A bolt 98, passing through each adjustment slot 96 is engaged by a wing nut 100 for adjustment of the lateral dimension encompassed by extension wings 94. Similar extension wings (not shown) may be provided at front and/or rear of terminal support tray 50 for constraining motion of computer terminal 66 in those directions.

If computer terminal support 10 is intended for use in a single work station, an axis of king post 12 (FIG. 1) may be inclined away from the worker in order to accommodate the tendency of computer terminal support 10 to deflect slightly downward when loaded by a computer terminal 66 which may typically weigh as much as about 65 pounds for a computer terminal support 10 having its own disk drives and central processing unit. When rotation in all directions about king post 12 is required, inclining of king post 12 in this way to favor a particular direction for extension may not be desirable.

Referring now to FIG. 3, there is shown a computer terminal support 10 installed to serve workers at a plurality, suitably four, desks 18, 18′, 18″ and 18′″. U-shaped clamp 14 is affixed to desk 18, as previously described. The location of computer terminal 66 is controllable anywhere within a substantial coverage area 102 of desk 18 as well as of adjacent desks 18′, 18″ and 18′″. As previously described, a horizontal and vertical angle of display screen 64 of computer terminal 66 may be adjusted to suit local conditions independently of where in coverage area 102 computer terminal 66 may be disposed. Thus, a worker at any one of desks 18, 18′, 18″ or 18′″ may avail himself of computer terminal 66 in full comfort and efficiency.

Referring now to FIG. 4, in an alternative embodiment of the invention, a clamp plate 14′, affixed to the base of king post 12 is secured to desk 18 using a plurality of bolts 104 passing through holes 106 bored in desk 18 and tightened with nuts 108. A washer 110 may optionally be disposed between nut 108 and the lower surface of desk 18 to avoid abrasion of the lower surface of desk 18 and to achieve secure retention of clamp plate for a longer time without loosening.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A computer terminal support for providing an adjustable and extensible mount for a computer terminal including at least a visual display screen, comprising:
    a king post;
    means for affixing said king post with a first axis thereof disposed in a substantially vertical position;
    first pivoting means rotatable in a substantially horizontal direction about said first axis;
    means for adjusting a vertical position of said first pivoting means along said first axis;
    a first swivel arm affixed to said pivoting means for concerted rotation therewith about said first axis;
    second pivoting means at a distal end of said first swivel arm rotatable in a substantially horizontal direction about a second substantially vertical axis;
    a second swivel arm affixed to said second pivoting means for concerted rotation therewith about said second axis;
    a third pivoting means at a distal end of said second swivel arm rotatable in a substantially horizontal direction about a third substantially vertical axis;
    a horizontally-disposed intermediate support tray affixed to said third pivoting means and movable therewith in a substantially horizontal direction about said third axis;
    a terminal support tray overlying said intermediate support tray and sized to support a computer terminal thereon; fourth pivoting means connecting said terminal support tray to said intermediate support tray for tilting movement about a fourth substantially horizontal axis whereby adjustment of a position of said computer terminal with five degrees of freedom is provided; and
    tilt-control means for manually moving and retaining said terminal support tray about said fourth axis to selected tilted positions, whereby said visual display screen is adjusted to the view of the user.

2. A computer terminal support according to claim 1 wherein said means for affixing said king post includes a U-shaped clamp affixed to said king post, said U-shaped clamp being adapted for fitting over a ledge, and clamping means effective for clamping said U-shaped clamp to said ledge.

3. A computer terminal support according to claim 2 wherein said clamping means includes a clamping bolt threadably engaged with said U-shaped clamp and adapted for bearing against a surface of said ledge.

4. A computer terminal support according to claim 3 wherein said clamping means further includes a plate disposed between said clamping bolt and said ledge.

5. A computer terminal support according to claim 1 wherein said means for affixing said king post includes a clamp plate affixed to said king post, said clamp plate including holes therein for accommodating bolts passing therethrough and through aligned holes in a ledge, and said bolts being effective for rigidly affixing said clamp plate to said ledge.

6. A computer terminal support according to claim 1 wherein said first pivoting means includes a pivoting bearing collar rotatably fittable over said king post.

7. A computer terminal support according to claim 6 wherein said means for adjusting a vertical position includes a height-adjusting collar supportingly fittable upon said king post below said pivoting bearing collar and means for clamping said height-adjusting collar in a desired vertical position whereby a vertical position of said pivoting bearing collar is established.

8. A computer terminal support according to claim 1 wherein said second pivoting means includes an intermediate bearing post having an axis aligned with said second substantially vertical axis affixed to said distal end of said first swivel arm and an auxiliary bearing collar rotatably fittable upon said intermediate bearing post.

9. A computer terminal support according to claim 1 wherein said third pivoting means includes an outer bearing collar affixed to said second swivel arm and a substantially vertical shaft rotatably engaged with said outer bearing collar.

10. A computer terminal support according to claim 1 wherein said terminal support tray includes an adjustable means for supporting a separable keyboard of a computer terminal.

11. A computer terminal support according to claim 10 wherein said adjustable means includes a generally U-shaped wire structure having first and second generally parallel legs, first and second support tubes affixed to said terminal support tray, said legs being slidably received in said tubes, and means for clamping said first and second legs in said first and second support tubes.

12. A computer terminal support according to claim 11 wherein said U-shaped wire structure includes a vertically upward bend at an outer extremity of said first and second legs, said vertically upward bend being effective for cradling said separable keyboard.

13. A computer terminal support according to claim 12 wherein said U-shaped wire structure includes a forward bend at an upper extremity of said vertically upward bend, said forward bend being effective for forming a bar, said bar providing a handle for adjusting at least a horizontal position and at least one angular position of said computer terminal.

14. A computer terminal support according to claim 1 wherein said terminal support tray includes a plurality of extension wings extending outward therefrom, said extension wings being effective for limiting transverse motion of a base of a computer terminal resting on said terminal support tray.

15. A computer terminal support according to claim 14 wherein said wings include means for adjusting at least one dimension of limits of said transverse motion whereby a range of footprint sizes of computer terminals are accommodated.

16. A computer terminal support according to claim 1 wherein said tilt-control means comprises a jack screw threadably mounted in vertical position on said intermediate support tray and having a free end portion engaging the bottom surface of said terminal support tray.

17. A computer terminal support according to claim 1 wherein said intermediate support tray includes a pair of spaced lips depending from the bottom surface thereof, and said terminal support tray includes a pair of spaced lips depending from the bottom surface thereof, the lips of said intermediate support tray extending parallel to and closely adjacent to the lips of said terminal support tray, and respective horizontal pivot members interconnecting each pair of adjacent lips to provide said fourth pivoting means.

* * * * *